United States Patent
Inatani et al.

(10) Patent No.: US 6,948,178 B2
(45) Date of Patent: Sep. 20, 2005

(54) DISC DRIVE

(75) Inventors: Takeshi Inatani, Tokyo (JP); Masaaki Takeshima, Tokyo (JP); Eiji Niikura, Tokyo (JP); Kei Shirahata, Tokyo (JP); Kazutoshi Taniguchi, Tokyo (JP); Takashi Kuzuu, Tokyo (JP); Shoji Tatehata, Tokyo (JP); Eiji Sasaki, Tokyo (JP); Tetsurou Nagami, Tokyo (JP); Kiichiro Murotani, Tokyo (JP); Hisashi Morita, Tokyo (JP); Nao Watanabe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 103 days.

(21) Appl. No.: 10/432,233

(22) PCT Filed: Oct. 24, 2001

(86) PCT No.: PCT/JP01/09348

§ 371 (c)(1),
(2), (4) Date: May 22, 2003

(87) PCT Pub. No.: WO03/036645

PCT Pub. Date: May 1, 2003

(65) Prior Publication Data

US 2004/0032819 A1 Feb. 19, 2004

(51) Int. Cl.⁷ ............................ G11B 21/02; G11B 7/08; G11B 7/085

(52) U.S. Cl. ............................................ 720/675
(58) Field of Search ............................. 720/674, 675, 720/691

(56) References Cited

U.S. PATENT DOCUMENTS

| 5,150,352 A | * | 9/1992 | Kurihara ..................... 720/661 |
| 5,995,479 A | * | 11/1999 | Takizawa et al. ............ 720/675 |
| 6,356,525 B1 | * | 3/2002 | Ikedo et al. ................. 720/675 |
| 2001/0005356 A1 | * | 6/2001 | Park ............................ 369/255 |

FOREIGN PATENT DOCUMENTS

| JP | 02214024 A | * | 8/1990 | ............ G11B/7/08 |
| JP | 11-283253 A |  | 1/1999 | |
| JP | 11-224438 A |  | 8/1999 | |
| JP | 2000-195062 A |  | 7/2000 | |
| JP | 2001052346 A | * | 2/2001 | ............ G11B/7/08 |
| JP | 2001155360 A | * | 6/2001 | ............ G11B/7/095 |
| JP | 2001176086 A | * | 6/2001 | ............ G11B/7/08 |

* cited by examiner

*Primary Examiner*—William J Klimowicz
(74) *Attorney, Agent, or Firm*—Birch Stewart Kolasch & Birch LLP

(57) ABSTRACT

A disk device including a movable portion which supports pivotally and enably to swing a feed screw axis, a thread motor to drive a small gear and the like which engage with a gear interlocked in an end portion of the feed screw axis thereby to rotate the feed screw axis, and a control screw to perform a height control of the movable portion.

4 Claims, 12 Drawing Sheets

FIG.9
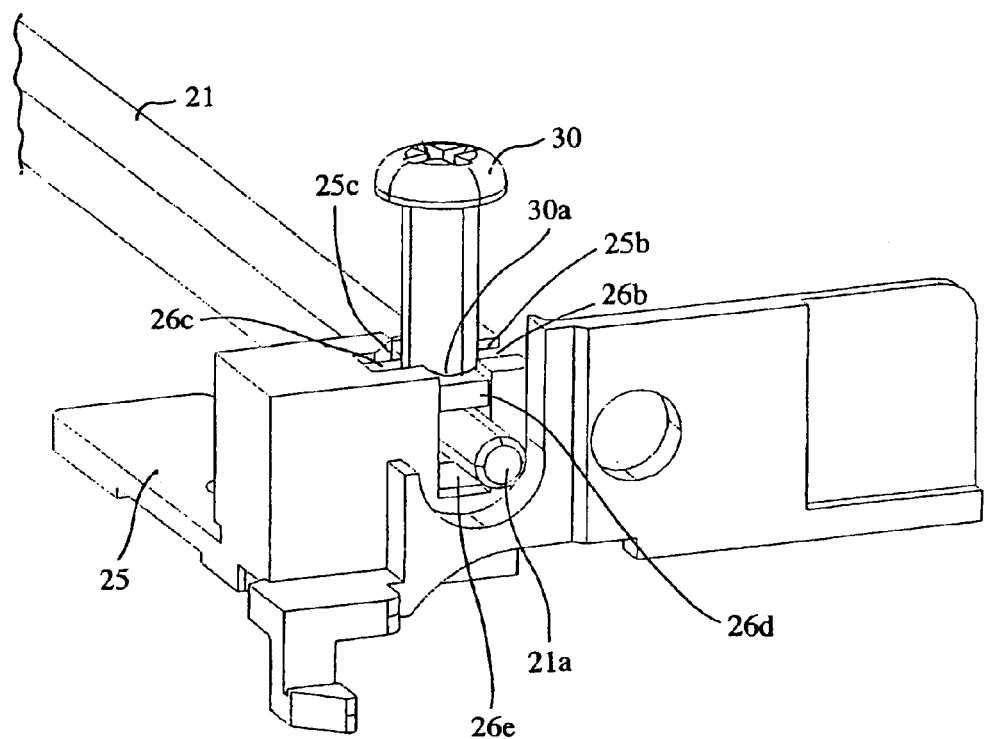
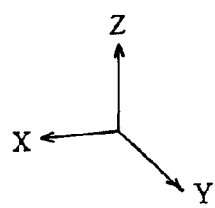

DISC DRIVE

This application is the national phase under 35 U.S.C. § 371 of PCT International Application No. PCT/JP01/09348 which has an International filing date of Oct. 24, 2001, which designated the United States of America.

TECHNICAL FIELD

The present invention relates to a disk device in which an angle adjustment of feed screw axis in relation to a base, can be performed.

BACKGROUND ART

In Japanese Laid Open Patent Hei 11-283253, a disk device is disclosed in which whole driving unit is performed a height control in relation to a base as shown in FIG. 1 in order not to lose a driving force which is transferred from a driving source to a feed screw axis by performing the height control when an angle adjustment of feed screw axis in relation to the base is performed by a control of attaching height in relation to the base for an end portion of the feed screw (hereinafter refereed to as first prior art).

Also in Japanese Laid Open Patent Hei 11-224438 a disk device is disclosed in which one end portion of driving force transferring side is fixed on a base and it has not been performed the height control and only the other end is performed the height control as shown in FIG. 2 (hereinafter refereed to as second prior art).

Because the disk devices in the prior art are composed as described above, a controlled movable portion in the height control becomes larger when the whole driving unit is performed the height control in relation to the base (the first prior art), it causes a problem that overall dimensions of the mechanism becomes larger.

On the other hand in the second prior art, the controlled movable portion can be made smaller on which the height control is performed, however, it causes a necessity that the driving means must be located on the other side of a height control performed side, and basically one end is fixed and other end is performed the height control to perform the angle adjustment. In this case in order to reduce a discrepancy of height along a focusing direction between an optical pick up and a disk, which is caused in connection with the height control, the height control is performed at an end portion of the disk peripheral side. Because the driving means must be arranged at a center side of the disk, a space to arrange the driving means is required at the vicinity of a disk motor. Especially for a disk changing mechanism in which a plurality of disks are stocked within one device and they are sequentially exchanged to perform a disk reproducing or a disk recording, there are so many devices in which a reproducing unit is driven within the device, a mechanism layout design becomes difficult when dimension of a mechanism in the vicinity of a disk motor is large.

At the same time in the second prior art, because the height control can be performed only at one end portion of the device, though the angle adjustment of feed screw axis in relation to the base can be performed, the height control at both ends cannot be achieved and thereby it causes a problem that even when the height control for whole screw axis in relation to the base is required in conjunction with the angle adjustment, it cannot be achieved.

Further in the second prior art, a shaft bearing member at the height control side is composed of one shaft bearing block, and it is guided enably to be performed the height control by a shaft bearing sliding block which is fixed on the base, because this guide is structured by an interlocking of these two, when a clearance between them is large by a fluctuation in tolerance of parts, it causes a problem that a positioning of the shaft bearing block becomes unstable when the shaft bearing block rattles also in a direction other than the height control in relation to the shaft bearing sliding block.

The present invention has been made to solve the above described problems and it is an object of the invention to provide a disk device in which the feed screw axis can be accurately positioned as well as the angle adjustment of feed screw axis in relation to a base and the height control of whole feed screw axis, can be performed without having scaling up of whole mechanism and without reducing a degree of freedom in designing.

DISCLOSURE OF THE INVENTION

The disk device in accordance with the present invention includes a movable portion to support pivotally and enably to swing a feed screw axis; a driving means for the feed screw axis to be rotated by driving a gear which engages with a gear interlocked at an end portion of height control side of the feed screw axis; and a control means to control a height of the movable portion.

By this arrangement an effect can be produced that an angle adjustment of the feed screw axis and a height control of whole feed screw axis in relation to the base is made possible to be achieved and at the same time the feed screw axis is accurately positioned without having a scale up of whole mechanism and without reducing a degree of freedom in designing.

The disk device in accordance with the present invention includes a shaft center of gear which is arranged such that it is located in the same height of a middle point in a range of the height control by the height control means and it is located on a line perpendicular to a direction of the height control by the height control means.

By this arrangement an effect can be produced that a driving force from a driving means is made surely to be transferred to the feed screw axis because a variation of gear distance can be minimized when the feed screw axis is performed the height control and an engagement of gears within a range of the height control can always be maintained.

The disk device in accordance with the present invention includes a holding portion which is fixed on the base to support the movable portion in the height direction and at the same time to regulate a positioning of the feed screw axis in a direction perpendicular to the axial direction and a height direction.

By this arrangement an effect can be produced that accuracy of positioning for the feed screw axis is raised.

The disk device in accordance with the present invention includes a swinging axis which is arranged on the movable portion for the movable portion to swing around an axis parallel to an axial direction of the feed screw axis and to support the swinging axis enably to swing.

By this arrangement an effect can be produced that a degree of freedom in designing for mechanism arrangement can be raised because it is made possible to easily change an arrangement of the control means.

BRIEF DESCRIPTION OF THE DRAWINGS

FIG. 9 is a perspective view to show a height control mechanism of the feed screw axis.

BEST MODE FOR CARRYING OUT THE INVENTION

For explaining the present invention in more detail, best modes for carrying out the invention will be described hereinafter with reference to the accompanied drawings.

Embodiment 1

Figure 1:
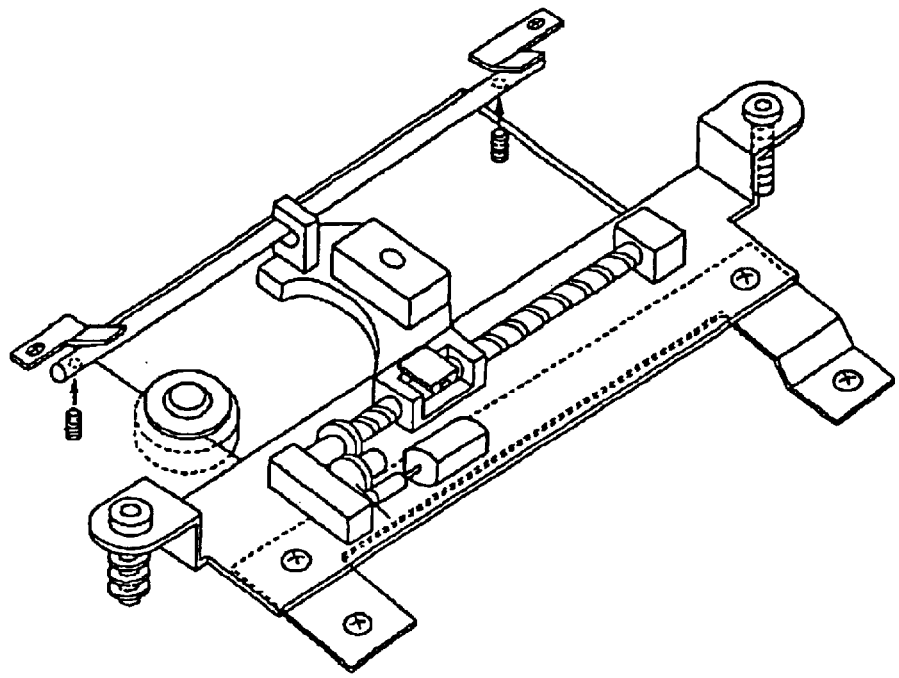
FIG. 1 is a perspective view to show a disk device in the prior art.
Figure 2:
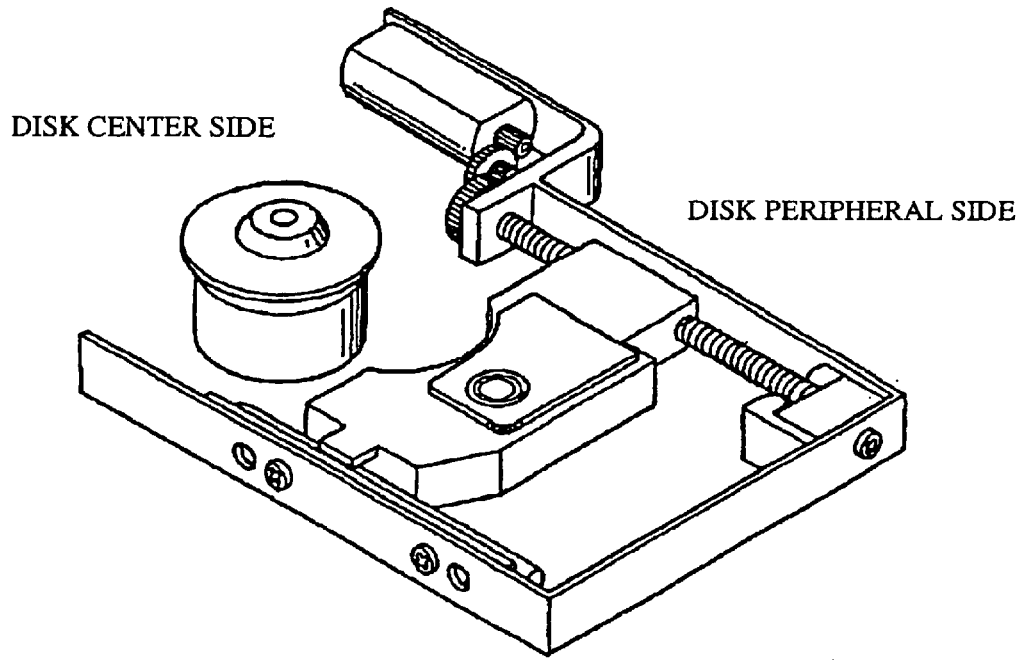
FIG. 2 is a perspective view to show a disk device in the prior art.
Figure 3:
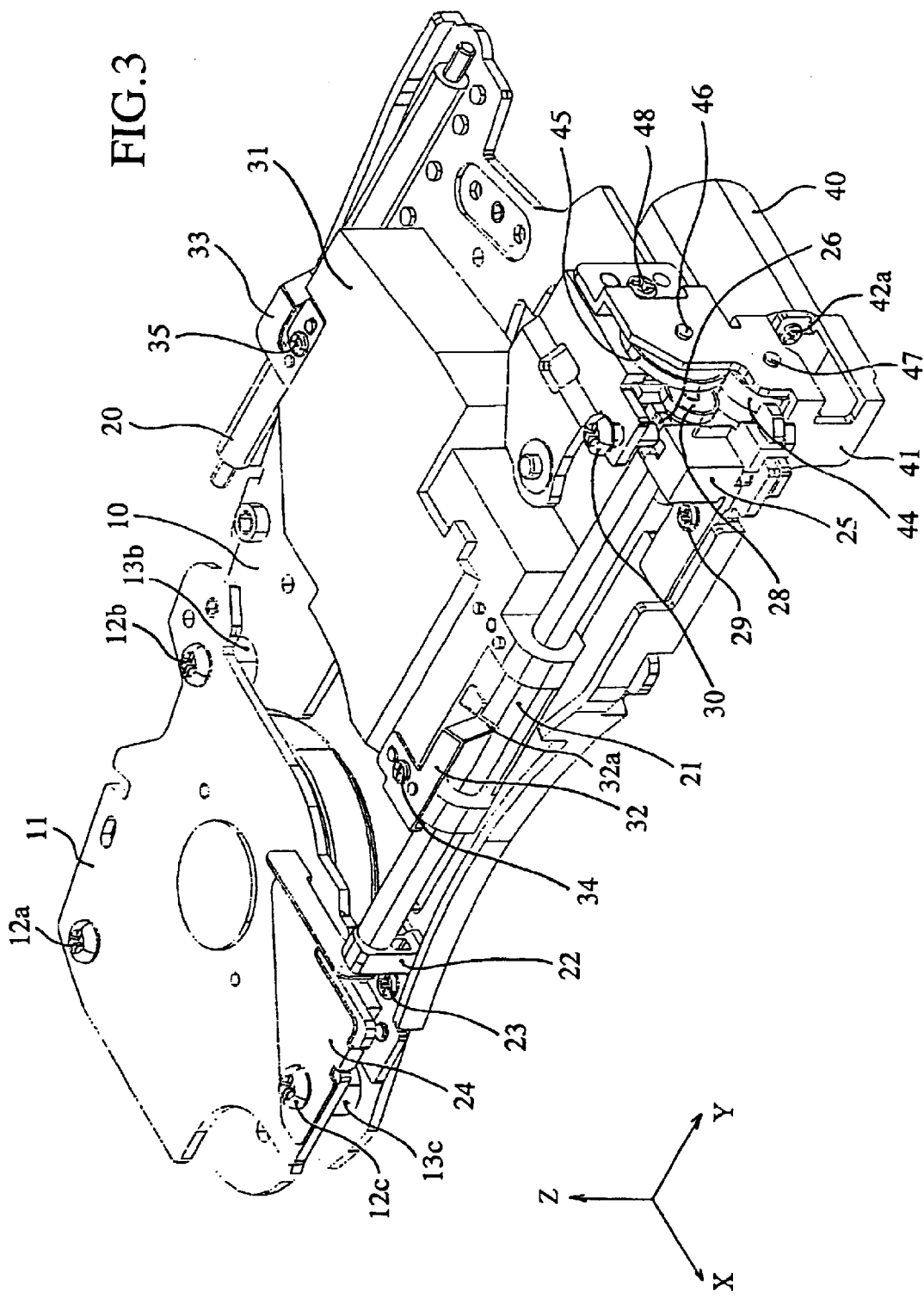
FIG. 3 is a perspective view to show whole optical head driving mechanism including a feed screw axis height control mechanism of a disk device according to embodiment 1 of the present invention when looking from back side.
Figure 4:
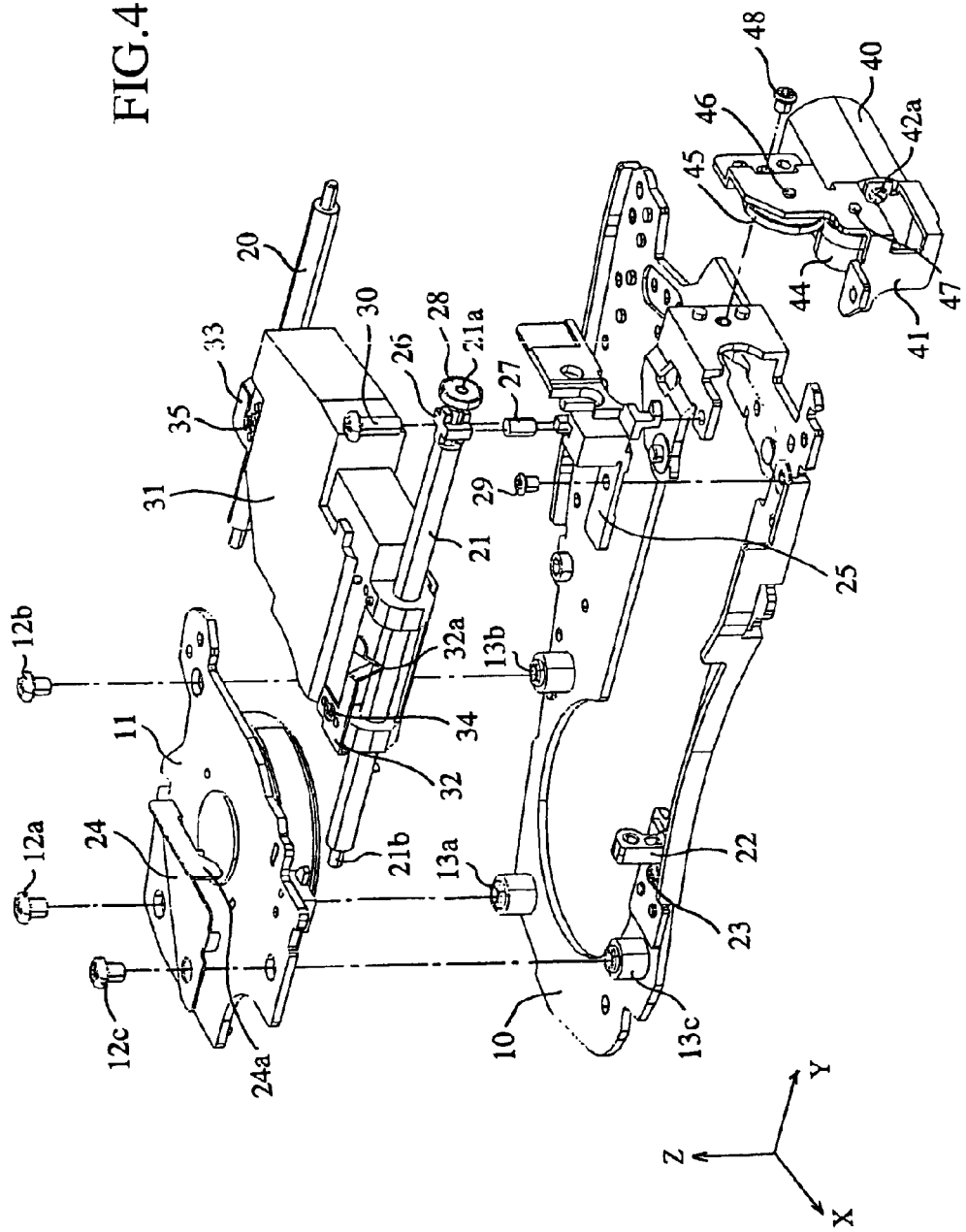
FIG. 4 is an exploded perspective view to show the disk device shown in FIG. 3.
Figure 5:
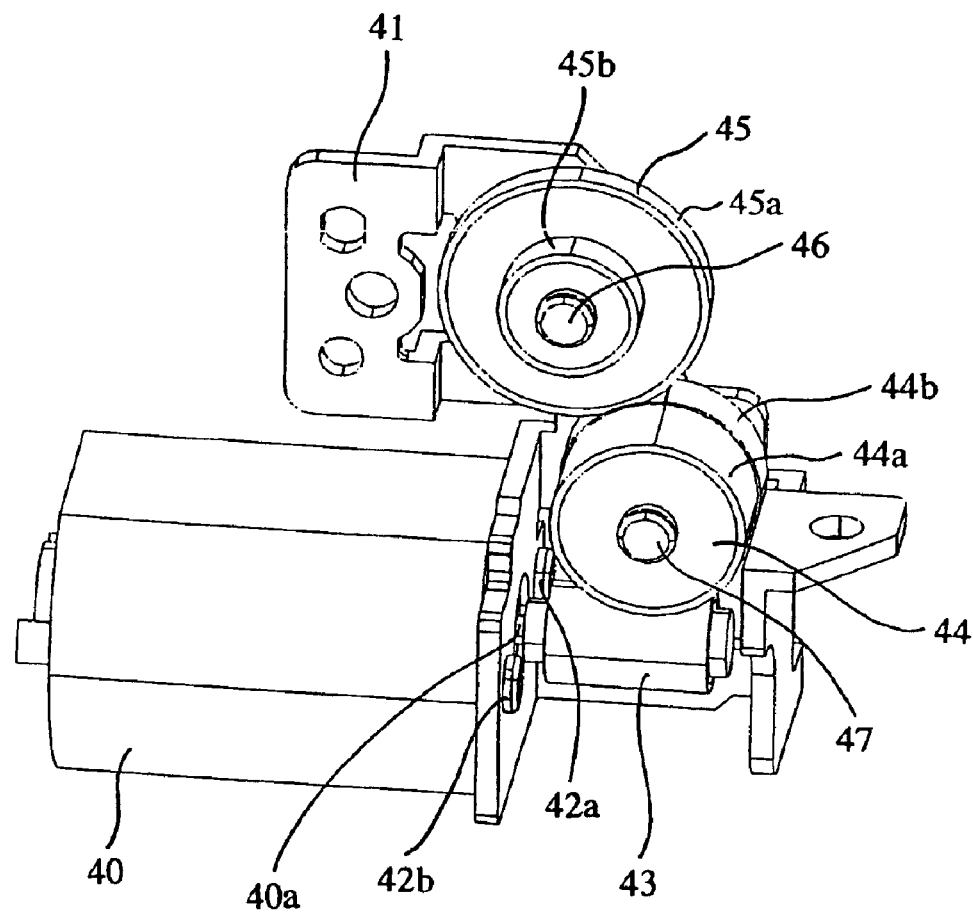
FIG. 5 is a perspective view to show a driving means and a gear.
Figure 6:
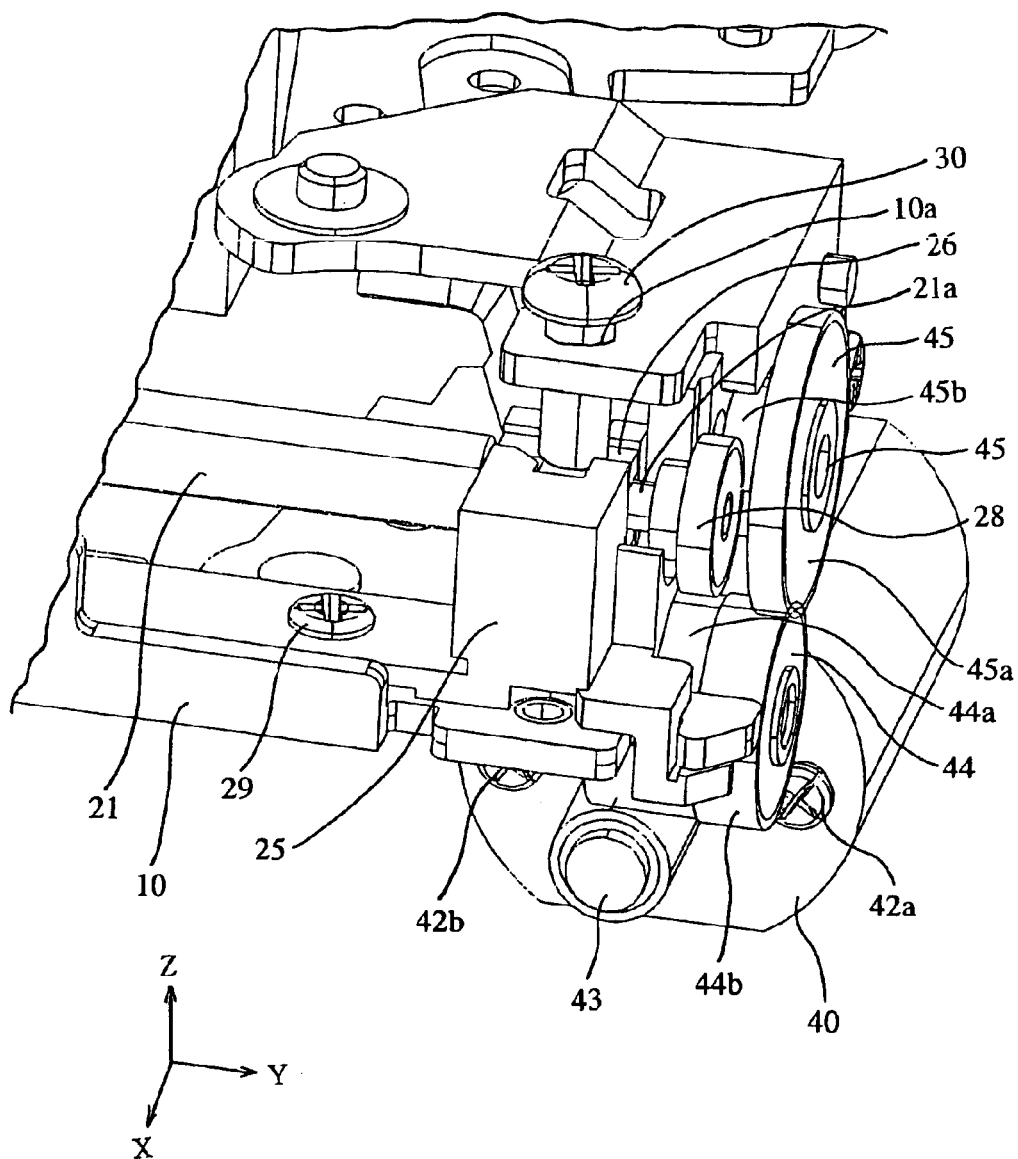
FIG. 6 is a perspective view to show how to attach the driving means and the gear onto a base shown in FIG. 5.
Figure 7:
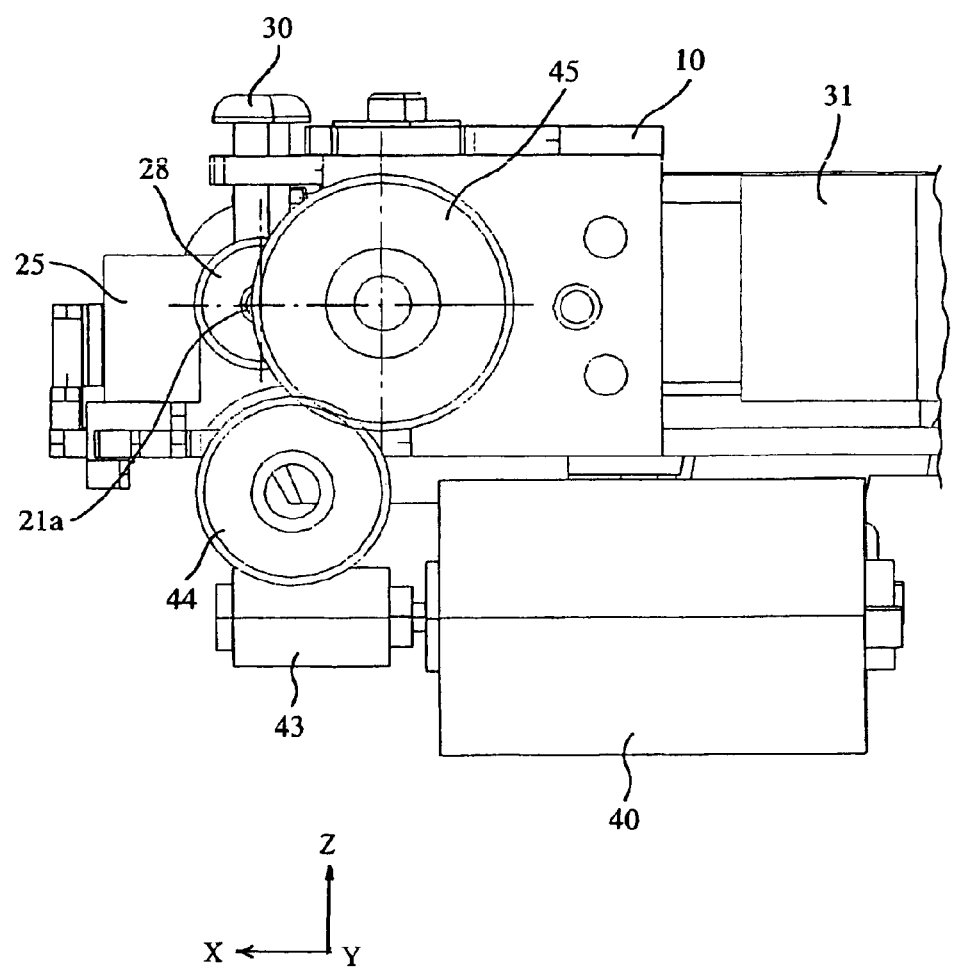
FIG. 7 is a side view of FIG. 6 when looking from Y direction.
Figure 8:
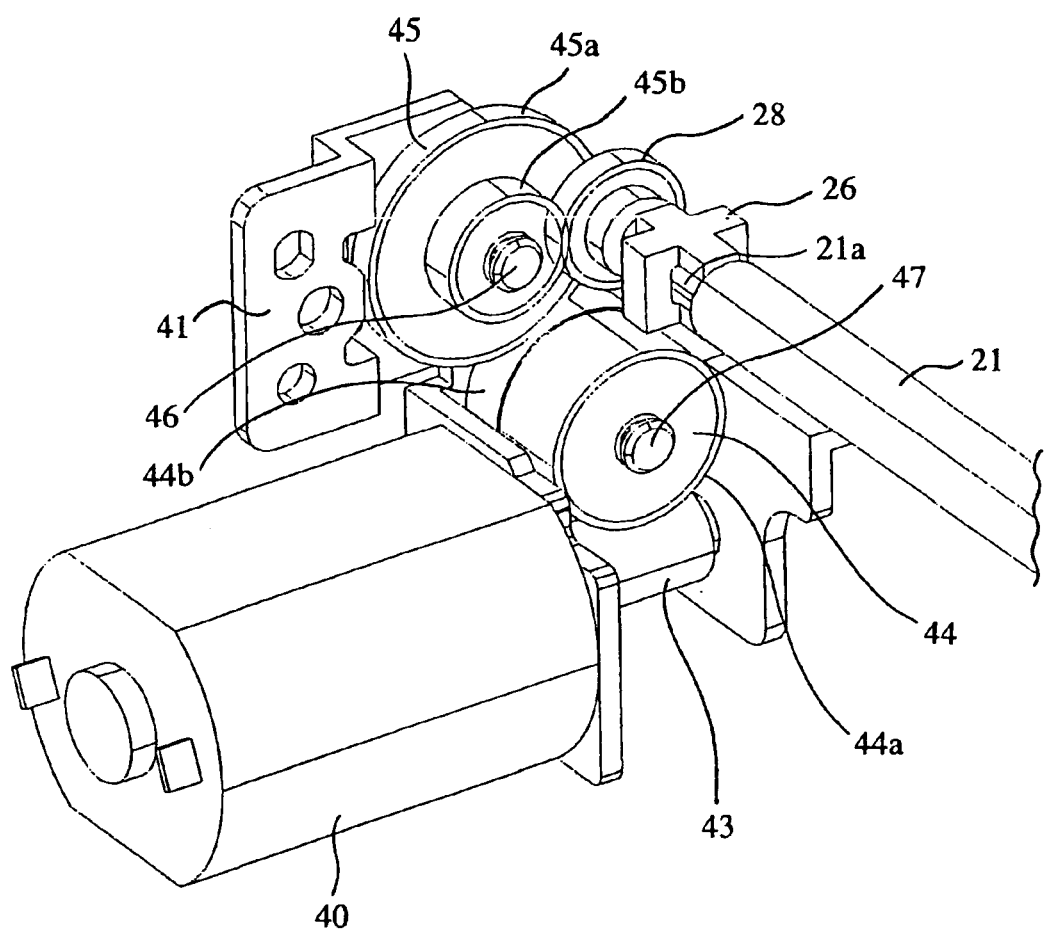
FIG. 8 is a perspective view to show an arrangement of gears to transfer a driving force from a driving means to a feed screw axis.
Figure 10:
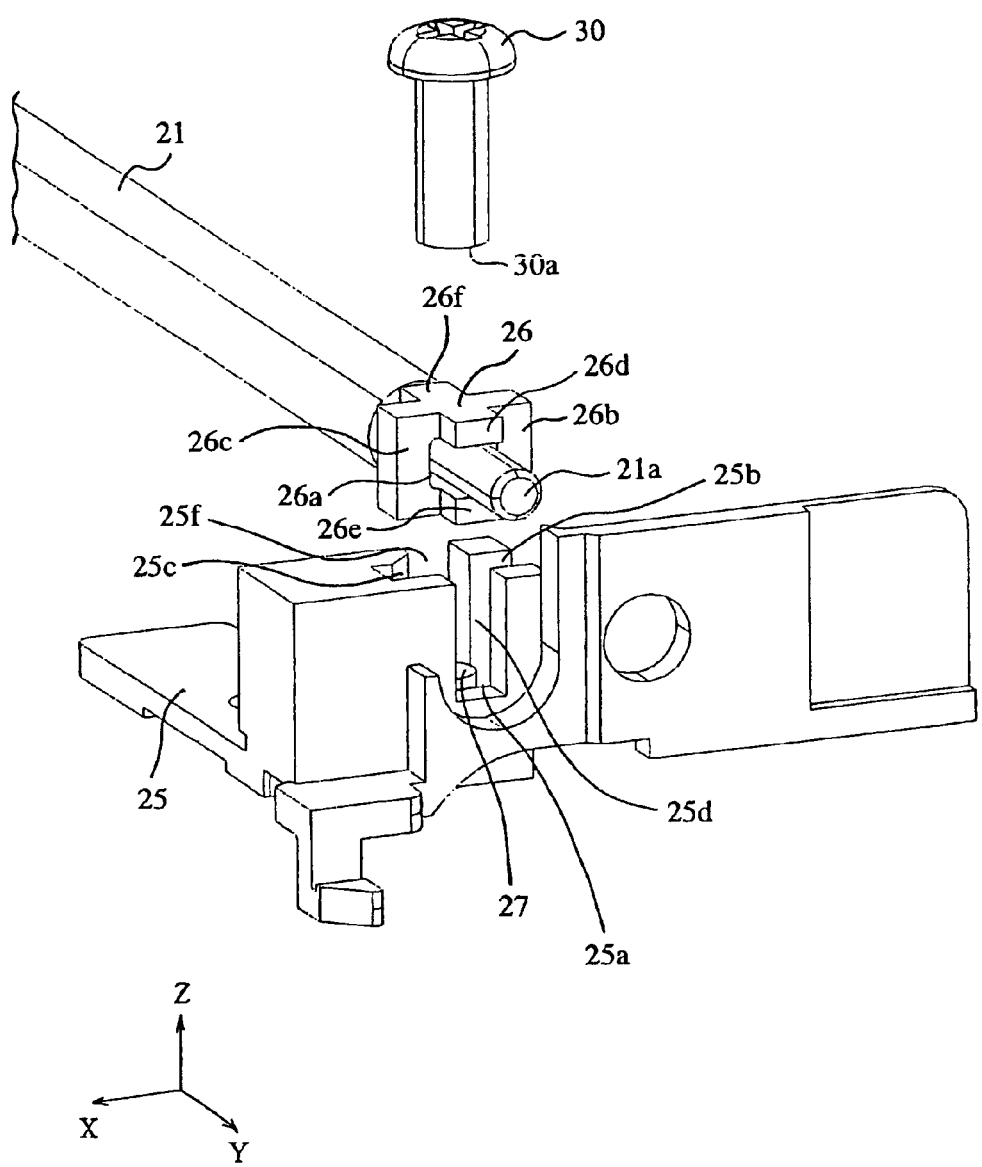
FIG. 10 is an exploded perspective view of FIG. 9.

FIG. 3 is a perspective view to show whole optical head driving mechanism including a feed screw axis height control mechanism of a disk device according to embodiment 1 of the present invention when looking from back side, FIG. 4 is an exploded perspective view to show the disk shown in FIG. 3, FIG. 5 is a perspective view to show a driving means and a gear, FIG. 6 is a perspective view to show how to attach the driving means and the gear onto a base shown in FIG. 5, FIG. 7 is a side view of FIG. 6 when looking from Y direction, FIG. 8 is a perspective view to show an arrangement of gears to transfer a driving force from a driving means to a feed screw axis, FIG. 9 is a perspective view to show a height control mechanism of the feed screw axis and FIG. 10 is an exploded perspective view of FIG. 9. At this point directions X, Y and Z designated in these respective drawings are set to be common in these respective drawings.

In FIG. 3 and FIG. 4 a reference numeral 10 designates a base, 11 designates a disk motor which is fixed on the base 10 by locking screws 12a, 12b, 12c via supporting tables 13a, 13b, 13c which are fixed on the base 10 by a manner caulking and the like, 12a, 12b, 12c designate locking screws, 13a, 13b, 13c designate the supporting table which are fixed on the base 10, 20 designates a guiding axis, 21 designates a feed screw axis which movably supports an optical pick up 31 along a radial direction of the disk as well as the guiding axis 20, 22 designates a shaft bearing which is fixed by the locking screw 23 on the base 10 to support enably to swing an end portion 21b of the feed screw axis 21.

A reference numeral 23 designates a locking screw, 24 designates a leaf spring which contacts with the end portion 21b of the feed screw axis 21 at tip end portion 24a to urge the feed screw axis 21 along its axis direction, 25 designates a holding portion which regulates a positioning of the feed screw axis 21 in a direction perpendicular to the axial direction and a height direction, 26 designates a movable portion which supports pivotally and enably to swing the feed screw axis 21, 27 designates an elastic member which is arranged at a hole portion 25a of the holding portion 25 to energize the movable portion 26 in Z (+) direction, 28 designates a gear which is made to be interlocked at an end portion 21a of the feed screw axis 21, 29 designates a locking screw, and 30 designates a control screw which engages with a tap portion made on the base 10 and is arranged at a position where a tip portion 30a contacts with the movable portion 26, the control screw 30 consists the control means that controls a height of the movable portion 26.

A reference numeral 31 designates an optical pick up which moves along a radial direction of the disk when the feed screw axis 21 is rotated, 32 designates a leaf spring whose nut portion 32a engages with a leading screw (not shown) made on the feed screw axis 21 for the optical pick up 31 to be moved along the radial direction of disk by a rotation of the feed screw axis 21, 33 designates an urging spring which is fixed on the optical pick up 31 by locking screws 34, 35 to move along the radial direction of disk in a manner contacting with the guiding axis 20, and 34, 35 designate locking screws.

In FIG. 5 a reference numeral 40 designates a thread motor (driving means) which is fixed on a gear base 41 by locking screws 42a, 42b for the feed screw axis 21 to be rotated by the gears, 42a, 42b designate locking screws, 43 designates a worm gear which is fixed on a shaft 40a of the thread motor 40, 44 designates gears which are supported by a supporting shaft 47 fixed on the gear base 41, in which a helical gear portion 44a engages with the worm gear 43, a flat gear portion 44b engages with a large gear 45a of the gears 45, 45 designates gears which are pivotally supported by a supporting axis 46 fixed on the gear base 41, 46 and 47 designate the supporting axes.

At this point the holding portion 25 shown in FIG. 9 and FIG. 10, is fixed on the base 10 by the locking screw 29. The movable portion 26 rotatably and pivotally supports the end portion 21a of feed screw axis 21 by a hole portion 26a to regulate the height along Z direction.

Protruding portions 26b, 26c of the movable portion 26 engage with cut portion 25b, 25c of the holding potion 25, and protruding portions 26d, 26e, 26f, 26g (not shown) of the movable portion 26, which respectively protrude in Y direction, are made having a relation in dimension by which they engage with cut portions 25d, 25f of the holding portion 25, thereby the movable portion 26 is movably supported along Z direction by the holding portion 25. At this point the cut portion 25d, 25f regulate a positioning of the end portion 21a of feed screw 21 along X direction and support it rotatably and pivotally.

On the other hand the thread motor and the gears which are supported by the gear base 41, are fixed on the base 10 by locking screw 48 as shown in FIG. 3 and FIG. 4. At this point a shaft center of the gear 45 is located about a middle point in a range of the height control of the feed screw axis 21 and at the same time it is located on a line perpendicular to a direction of the height control as shown in FIG. 8. By this arrangement a small gear 45b and the gear 28 are made to be engaged together to transfer a driving force from the thread motor 40 to the feed screw axis 21.

Hereinafter operation of the disk device will be explained.

A height along Z direction of the end portion 21a of feed screw axis 21 which is supported enably to go up and down along Z direction in relation to the holding portion 25 is defined to position by a height along Z direction of the movable portion 26.

By tightly fastening the control screw 30, the movable portion 26 moves to Z (−) direction with resisting an urging force in Z (+) direction by the elastic member 27. On the other hand when loosing the control screw 30, the movable portion 26 moves to Z (+) direction by the urging force of elastic member 27.

By this arrangement a height control of the end portion 21a of feed screw 21 along Z direction can be realized. In connection with this control the gear 28 fixed on the end portion 21a is also displaced in Z direction. Accordingly a gear distance between the gear 28 and the small gear 45b is varied, however, this variation of gear distance can be minimized by an arrangement that a central axis of the small gear 45b is positioned such that it is located about the middle point within a range of the height control of feed screw axis 21 and located on a line perpendicular to the direction of height control. Even in a case when the range of height control is so small in comparison with the gear distance, it is made possible to transfer the driving force without height adjustment of the thread motor 40 or the gears to transfer the driving force because an engagement of gears can be kept even in relation to the distance variation.

Also a positioning of the end portion 21a of feed screw axis 21 along Z direction is regulated by the movable portion 26 as described above. On the other hand a positioning along X direction is regulated by the cut portions 25d, 25f which are arranged on the holding portion 25 fixed on the base 10, thereby it is made possible to decide position without effected by an operation of the control for the movable portion 26 along Z direction.

As it becomes apparent by the above description, a disk device in accordance with the Embodiment 1 of present invention brings about an effect that a number of parts which must be moves for the height control can be reduced, and thereby whole dimension of mechanism can be minimized by means that the height control mechanism of feed screw axis 21 are made as described above.

At the same time the disk device also brings about an effect that a degree of freedom in designing for mechanism arrangement can be raised because it is made possible to arrange the thread motor 40 in a same side with the height control side. Further, because it is made possible that the height control is performed at both ends of the feed screw axis 21, it brings about an effect that the height control of whole feed screw axis 21 in relation to the base 10 can be achieved in time with the angle adjustment.

Yet further because the positioning of feed screw axis 21 along X direction can be performed without influenced by the control operation of movable portion 26 along Z direction, it brings about also an effect that accuracy of positioning for the feed screw axis 21 along X direction can be raised.

Embodiment 2

Figure 11:
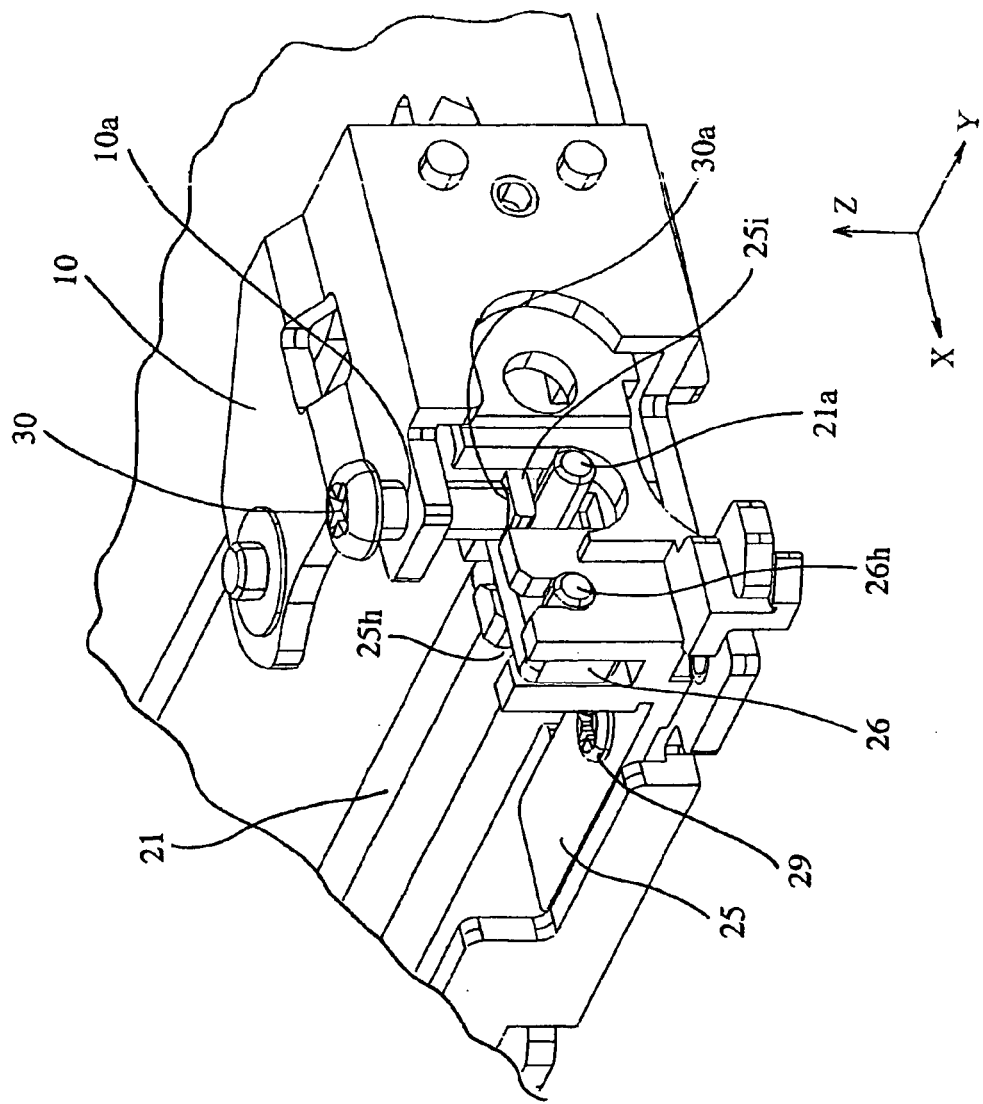
FIG. 11 is a perspective view of relevant part to show the height control mechanism of feed screw axis.
Figure 12:
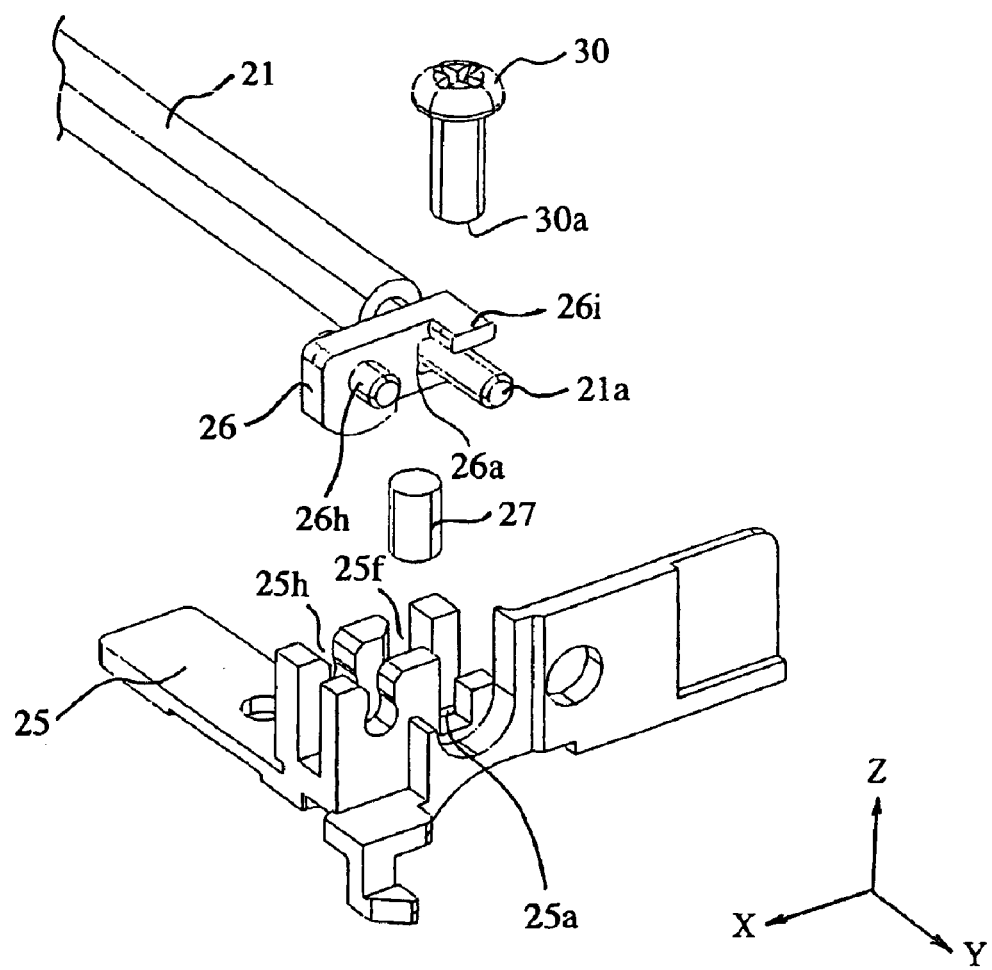
FIG. 12 is an exploded perspective view to show the height control mechanism of feed screw axis.
Figure 13:
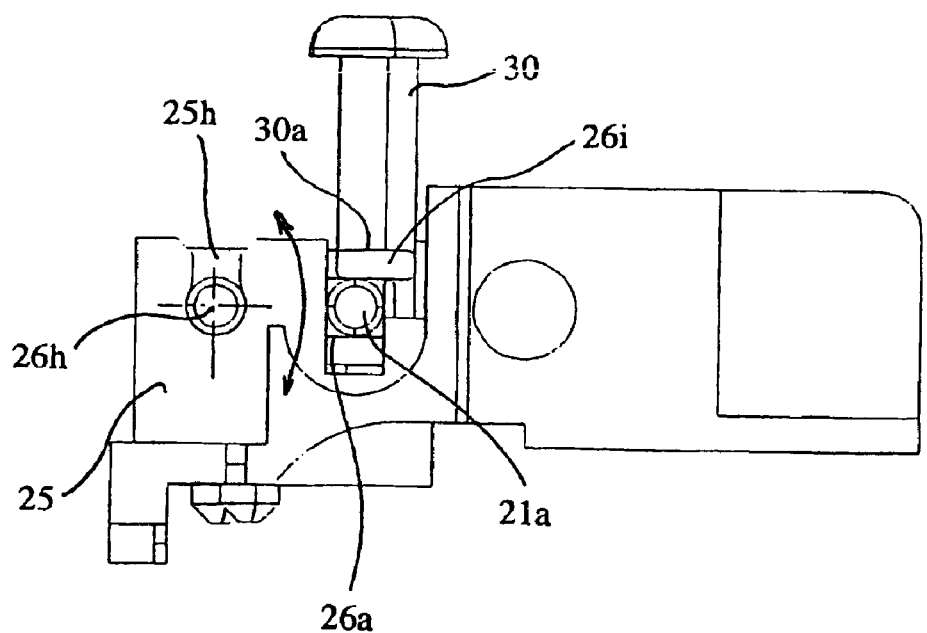
FIG. 13 is a side view of FIG. 12 when looking from Y direction.

FIG. 11 is a perspective view of relevant part to show the height control mechanism of feed screw axis, FIG. 12 is an exploded perspective view to show the height control mechanism of feed screw axis and FIG. 13 is a side view of FIG. 12 when looking from Y direction. Because the same reference numerals those used in FIG. 1 to FIG. 10 designate the same or the equivalent parts, further explanation on them will be omitted.

As shown in FIG. 12 the movable portion 26 has a swinging axis 26h which is arranged substantially parallel to a direction of the feed screw axis 21 and the swinging axis 26h engages with a hole portion 25h made on the holding portion 25. The holding portion 25 supports the movable portion 26 enably to swing around the swinging axis 26h. A reference symbol 26i designates a protruding portion made on the movable portion 26, it is arranged at a position at which it contacts with the tip portion 30a of control screw 30.

Hereinafter an operation of the disk device will be explained.

A height along Z direction of the end portion 21a of feed screw axis 21 is defined to position by a height along Z direction of the movable portion 26 which is supported enably to swing around the swinging axis 26h in relation to the holding portion 25.

By tightly fastening the control screw 30, the movable portion 26 moves with rotation to Z (−) direction with resisting the urging force in Z (+) direction by the elastic member 27. On the other hand when loosing the control screw 30, the movable portion 26 moves with rotation to Z (+) direction by the urging force of elastic member 27.

By this arrangement a height control of the end portion 21a of feed screw 21 along Z direction can be realized. At this point a position of the control screw 30 can be arbitrary arranged by means of changing a position of the protruding portion 26i which contacts with the control screw 30 as far as it is included within an area where the movable portion 26 can swing.

Also a positioning of the end portion 21a of feed screw axis 21 along Z direction is regulated by the movable portion 26 as described above. On the other hand a positioning along X direction is regulated by the cut portions 25f which is arranged on the holding portion 25 fixed on the base 10, thereby it is made possible to decide position without effected by an operation of the control for the movable portion 26 along Z direction.

As it becomes apparent by the above description, the disk device in accordance with the Embodiment 2 of present invention brings about an effect that a degree of freedom in designing for mechanism arrangement can be raised because it is made possible to easily change an arrangement of the control screw 30 in addition to the effect given by the above described Embodiment 1.

INDUSTRIAL APPLICABILITY

As set forth above, the disk device in accordance with the present invention is suitable for a disk device in which it is required to prevent a scaling up of whole mechanism when the mechanism to achieve the angle adjustment of feed screw axis in relation to the base is installed.

What is claimed is:

1. A disk device comprising:
   a feed screw axis to movably support an optical pick up along a radial direction of disk;
   a movable portion by which an end portion of said feed screw axis is inserted through and protrudes therefrom, to support pivotally and enably to swing said feed screw axis;
   a driver for said feed screw axis to be rotated by driving a gear which engages with a gear interlocked at said end portion of a height control side of said feed screw axis protruding from said movable portion; and
   a controller to control a height of said movable portion.

2. The disk device according to claim 1, wherein a shaft center of the gear which is driven by said driver, is arranged such that it is located in the same height of a middle point in a range of the height control by a height controller and it is located on a line perpendicular to a direction of the height control by said height controller.

3. The disk device according to claim 1, wherein a holding portion which regulates a positioning of the feed screw axis in a direction perpendicular to the axial direction and a height direction, while the holding portion movably supports the movable portion in the height direction, is fixed on a base of said disk device.

4. The disk device according to claim 1, wherein a swinging axis for the movable portion to swing around an axis parallel to an axial direction of the feed screw axis, is arranged on said movable portion and a holding portion supports the swinging axis enably to swing.

* * * * *